US011375358B2

(12) United States Patent
Ramle et al.

(10) Patent No.: US 11,375,358 B2
(45) Date of Patent: Jun. 28, 2022

(54) RESET OF DYNAMIC ALLOWED AREA LIST FOR A UE (71) Applicant: Telefonaktiebolaget LM Ericsson (publ), Stockholm (SE)

(72) Inventors: Peter Ramle, Mölnlycke (SE); Qian Chen, Mölndal (SE); Josefin Karlsson, Torslanda (SE)

(73) Assignee: TELEFONAKTIEBOLAGET LM ERICSSON PUBL, Stockholm (SE)

( * ) Notice: Subject to any disclaimer, the term of this patent is extended or adjusted under 35 U.S.C. 154(b) by 195 days.

(21) Appl. No.: 16/483,903

(22) PCT Filed: Feb. 6, 2018

(86) PCT No.: PCT/EP2018/052934
§ 371 (c)(1),
(2) Date: Aug. 6, 2019

(87) PCT Pub. No.: WO2018/146090
PCT Pub. Date: Aug. 16, 2018

(65) Prior Publication Data
US 2021/0211861 A1 Jul. 8, 2021

Related U.S. Application Data (60) Provisional application No. 62/455,978, filed on Feb. 7, 2017.

(51) Int. Cl.
*H04W 60/06* (2009.01)
*H04W 8/18* (2009.01)
*H04W 60/00* (2009.01)

(52) U.S. Cl.
CPC ............. *H04W 8/18* (2013.01); *H04W 60/00* (2013.01); *H04W 60/06* (2013.01)

(58) Field of Classification Search
CPC ................................ H04W 8/18; H04W 60/00
See application file for complete search history.

(56) References Cited

U.S. PATENT DOCUMENTS

| 9,883,385 B2 * | 1/2018 | Lee ................... H04W 36/0055 |
| 10,687,300 B2 * | 6/2020 | Youn ....................... H04W 8/20 |
| 2017/0201871 A1 * | 7/2017 | Ryu ......................... H04W 4/70 |

FOREIGN PATENT DOCUMENTS

| WO | 2017/194755 A1 | 11/2017 |
| WO | 2017/220323 A1 | 12/2017 |

OTHER PUBLICATIONS

International Search Report and Written Opinion dated Apr. 18, 2018 issued in International Application No. PCT/EP2018/052934. (13 pages).

(Continued)

*Primary Examiner* — Michael T Vu
(74) *Attorney, Agent, or Firm* — Rothwell, Figg, Ernst & Manbeck, P.C.

(57) ABSTRACT

Embodiments herein relate to methods for resetting (507) a dynamically generated allowed area list, a Dynamic Allowed Area (DAA) list, for a user equipment (UE) performed by a network function (AMF, PCF), as well as a corresponding network function configured to perform the method. Further, embodiments herein relate to a corresponding method performed by a UE as well as a UE configured to perform the method.

22 Claims, 8 Drawing Sheets (56) References Cited

OTHER PUBLICATIONS

Huawei et al., "The procedure to activate RRC inactive connected mode", SA WG2 Meeting #S2-116BIS, S2-164563, XP051130535 (Aug. 2016). (4 pages).
Ericsson et al., "Mobility restriction", SA WG2 Meeting #118BIS, S2-170559, XP051216090, (Jan. 2017). (3 pages).
Ericsson, "Adding Interim Agreements on Mobility on Demand", SA WG2 Meeting #116BIS, S2-165389, XP051169368, (Sep. 2016). (3 pages).
Ericsson et al., "Mobility restriction", SA WG2 Meeting #118BIS, S2-170652 (revision of S2-170608), XP051227917, (Jan. 2017). (2 pages).
3GPP TS 23.501 V0.1.1 (Jan. 2017); 3rd Generation Partnership Project; Technical Specification Group Services and System Aspects; System Architecture for the 5G System; Stage 2 (Release 15); (Jan. 2017). (67 pages).
Ericsson et al., "Mobility restrictions updates", SA WG2 Meeting #119, S2-170807 (Feb. 2017). (4 pages).
3GPP TS 23.501 V0.2.0 (Jan. 2017); 3rd Generation Partnership Project; Technical Specification Group Services and System Aspects; System Architecture for the 5G System; Stage 2 (Release 15); (Jan. 2017). (69 pages).
3GPP TR 23.799 V14.0.0 (Dec. 2016); 3rd Generation Partnership Project; Technical Specification Group Services and System Aspects;Study on Architecture for Next Generation System (Release 14); (Dec. 2016). (522 pages).

\* cited by examiner

RESET OF DYNAMIC ALLOWED AREA LIST FOR A UE

CROSS REFERENCE TO RELATED APPLICATION(S)

This application is a 35 U.S.C. § 371 National Stage of International Patent Application No. PCT/EP2018/052934, filed Feb. 6, 2018, designating the United States and claiming priority to U.S. provisional application No. 62/455,978, filed on Feb. 7, 2017. The above identified applications are incorporated by reference.

TECHNICAL FIELD

Disclosed herein are, for example, techniques for resetting a dynamically generated allowed area list (a.k.a., a Dynamic Allowed Area (DAA) list) for a user equipment (UE) (i.e., a device capable of wireless communication, such as a smartphone, tablet, a sensor, an Internet of things (IoT) device).

BACKGROUND

Figure 1:
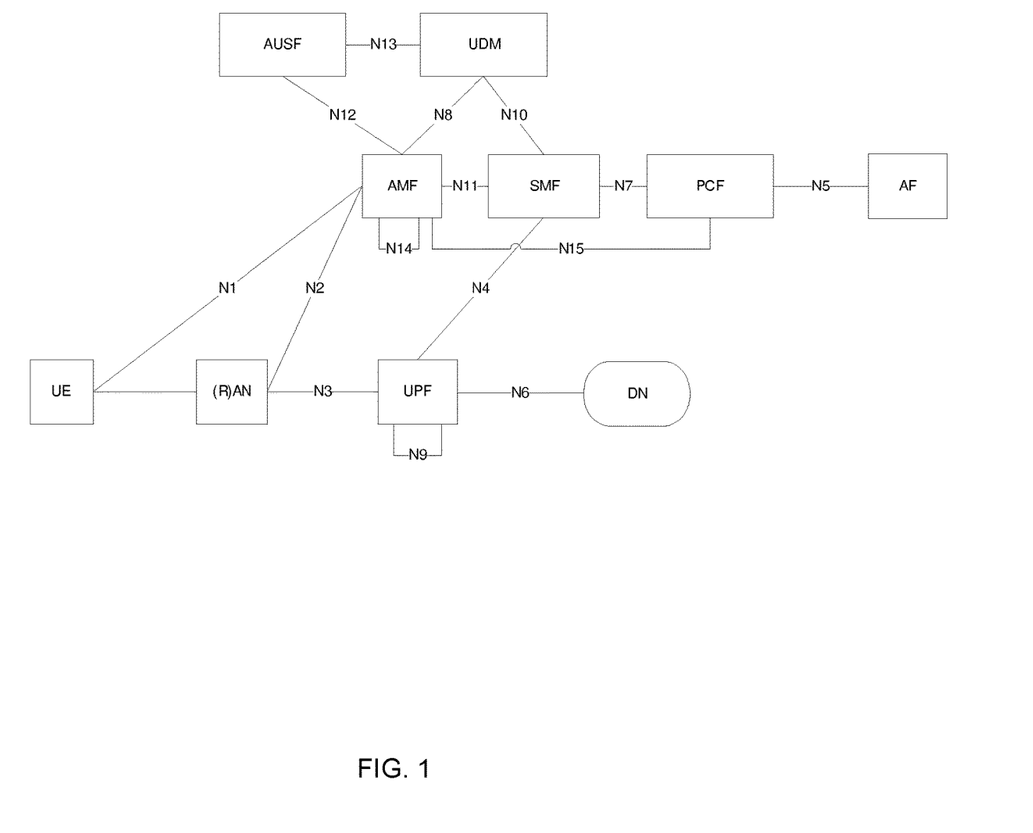
FIG. 1 illustrates a non-roaming architecture view for next generation networks, according to some embodiments.
Figure 2:
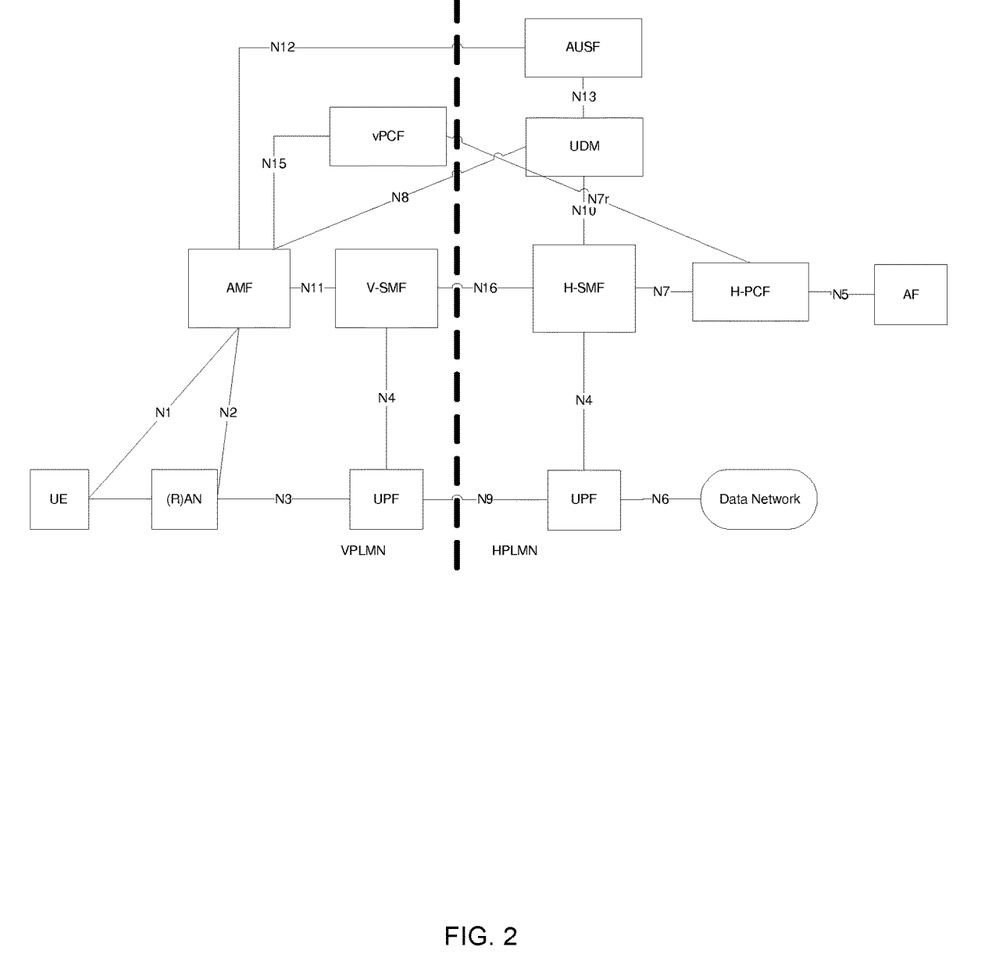
FIG. 2 illustrates a roaming (home-routed) architecture view for next generation networks, according to some embodiments.

The next generation networks need a solution for supporting DAA lists. As used herein, a DAA list is a set of allowed areas (e.g., a set of Tracking Areas (TAs) that may automatically change over time). FIG. 1 illustrates a non-roaming architecture view for next generation networks. FIG. 2 illustrates a roaming (home-routed) architecture view for next generation networks.

Referring to FIGS. 1 and 2, Unified Data Management (UDM) is the subscription information storage including all information for the subscribers (e.g., UEs) of the operator. At a high level, a subscriber's UE is connected to a data network via a core node (AMF) and a radio access node (RAN). When a UE connects to the network, subscription information is retrieved from UDM. In a roaming scenario the serving operator retrieves subscription information located in the home operator's network. In some instances, UDM can be seen as similar to a Home Subscriber Server (HSS) or Home Location Register (HLR), the first used for Long Term Evolution (LTE)/Evolved Packet System (EPS) networks and the second used for Global System for Mobile Communications (GSM) Enhanced Data rates for GSM Evolutions (EDGE) Radio Access Network (GERAN) and Universal Mobile Telecommunications System (UMTS) Terrestrial Radio Access Network (UTRAN).

The Policy Control Function, PCF is a similar function as PCRF used for GERAN, UTRAN, and E-UTRAN.

The Core Access and Mobility Management Function (AMF) and Session Management Function (SMF) represent the control plane of the core network and have the same functionality as the control plane parts of Serving General Packet Radio Service (GPRS) Support Node (SGSN), Mobility Management Entity (MME), Gateway GPRS Support Node (GGSN), Serving Gateway (SGW) and Packet Data Network Gateway (PGW) in GERAN, UTRAN, and E-UTRAN. However, GERAN and UTRAN may not be supported in next generation, or 5G networks.

The concept of Mobility Restriction is included in 3GPP TS 23.501 clause 5.2.3, and within that the service access restrictions part. Clause 5.2.3 provides in relevant part:

"Service access restrictions: Defines areas in which the UE may or may not initiate communication with the network as follows:

Allowed area: In an allowed area under a given RAT, the UE is permitted to initiate communication with the network as allowed by the subscription.

Non-allowed area: In a non-allowed area under a given RAT a UE is service access restricted. The UE is not allowed to initiate Service Request or SM signalling to obtain user services (both in CN-IDLE and in CN-CONNECTED states). The UE shall perform periodic registration updates and normal registration updates due to mobility. The UE in a Non-allowed area shall respond to core network paging.

For a given UE, the core network determines the service area restrictions based on UE subscription information. Optionally the allowed area may in addition be fine-tuned by the PCF e.g. based on UE location, and network policies. Service area restrictions can be changed due to, e.g. subscription, location, and/or policy change. Service area restrictions may be updated during a Registration procedure."

Clause 5.3.2.3.2 of 3GPP TS 23.501 describes the management of the service access restrictions:

"A service area restriction may contain one or more (e.g. up to 16) entire tracking areas. An allowed area may alternatively be unlimited i.e. it may contain all tracking areas.

The UDM stores the service area restrictions of a UE as part of the UE's subscription data. The PCF in the serving network may (e.g. due to varying conditions such as UE's location, application in use, time and date) further adjust service area restrictions of a UE upon registration and mobility events, either by expanding an allowed area or by reducing a non-allowed area. The UDM and the PCF may update the service area restrictions of a UE at any time during registration procedures.

At initial registration, the AMF fetches from the UDM the service area restrictions of the UE that may be further adjusted by the PCF. The serving AMF shall enforce the service area restrictions of a UE. The AMF may provide the UE with any pre-configured allowed area. For a UE in CN_Connected state the AMF shall indicate the service area restrictions of this UE to the RAN.

Upon change of serving AMF due to mobility, the old AMF may provide the new AMF with the service area restrictions of the UE that may be further adjusted by the PCF. In case of roaming, the service area restrictions are transferred from the UDM via the serving AMF to the serving PCF in the visited network. The serving PCF in the visited network may further adjust the service area restrictions."

SUMMARY

The embodiments disclosed herein disclose mechanisms for a UE to trigger a reset of a DAA list for the UE. When a DAA list is reset, all elements of the list (e.g., all TA identifiers) are removed from the list—i.e., when the DAA list is reset the list will be empty. The reset of the DAA list may be triggered by the UE when the UE transmits a message indicating a request for a reset of the DAA list. Such a message may be: i) a deregistration request message or 2) a DAA list reset request message (i.e., a message specifically for requesting the rest of the DAA list. A core network node may also trigger the reset of the DAA list for the UE. The embodiments disclosed herein further disclose a mechanism for a network node to determine whether to reset the DAA list in response to the UE transmitting a message indicating a request for a reset of the DAA list.

When the network node determines to not reset the DAA list (i.e., keep the DAA list), the network node further determines a quarantine time (the network node may also determine a place for storing the DAA list). The quarantine time indicates a period of time during which the DAA list for the UE will not be reset in response to messages from the UE indicating a request for a rest of the DAA list (e.g., a deregistration request message or a DAA list reset request). In some embodiments, the network node may send the quarantine time to the UE to inform the UE that a reset of the DAA list may not be accepted within the given time period.

Herein, a network node is intended to mean a network node or a network function, as is clear from the description below. Further, the network function or node might be distributed in the cloud.

BRIEF DESCRIPTION OF THE DRAWINGS

The accompanying drawings, which are incorporated herein and form part of the specification, illustrate various embodiments.

DETAILED DESCRIPTION

Several updates may be proposed for the 3GPP TS 23.501 clauses noted above. For example, some proposals may include updating the Mobility restriction clause in TS 23.501 to include, among other things, the following proposals:

First Proposal

"It shall be possible to support service area restrictions by specifying a subscription parameter indicting the maximum size of the allowed area. The size parameter gives the maximum number of either allowed Tracking Areas (TAs) or allowed (R)AN node IDs. None, some, or all allowed TAs or (R)AN node IDs may be pre-configured in the subscription or added by the PCF."

Second Proposal

"It shall be possible to dynamically assign TAs or (R)AN node IDs to an allowed area for a UE, until the maximum allowed number of TAs or (R)AN node IDs has been reached."

Should these proposals be approved, it becomes possible to dynamically allocate an allowed area (AA) to a UE, based on TAs or (R)AN node IDs areas that the UE visits. That is, for example, it is possible to automatically add allowed areas to a DAA list.

As the AA in the subscription database (UDM) may only be defined by the size of the AA, the AA may not say anything about where the UE could get service. Without any such restrictions (i.e. without defining the allowed TAs, (R)AN node IDs areas, or cell areas), the assigned AA may not put any limitations on the mobility of the UE as the UE does not occupy more than one TA or (R)AN node IDs area at the same time. Therefore, there is a need to also define (statically or dynamically) the actual AA (i.e. the allowed TAs or (R)AN node IDs areas), and not only the size of the area.

It shall also be noted that the AAs for a UE does not necessarily have to be a continuous. For example, for a Digital Subscriber Line (DSL) replacement with one area for a primary residence and a second area for summer house, the AAs may be split into two subparts.

Due to the large amount of UEs and their individual AAs, it must be fairly easy to define the AAs regardless of whether the AAs are statically defined by an operator or dynamically defined based on a UE's registration attempts. With dynamic definition of an AA, there are risks for mistakes that may result in a less than perfect AA, and it is therefore necessary to use a mechanism that allows for corrections of the AA. However, misuse and manipulation of the AA must be prevented. If the subscribers are to be allowed to correct their AAs, the correction mechanism must impose some degree of effort from the user or some service degradation during the change or else the assigned AA may not introduce any perceived geographically based restrictions. Without such constraints, a small area subscription may be purchased for the UE, but the UE may still be used everywhere with full service.

Thus, when defining the TAs or (R)AN node IDs areas of an AA, the mechanism must either (i) to a good degree, ensure that the adding of a TA is intentional or (ii) ensure that it is easy to correct a mistake. There is a balance: The easier it is to make mistakes the easier it must be to correct them.

One solution would be to let the operator configure the AA for each UE in the subscription database with a small area subscription, and then optionally let the PCF adjust the AA. A benefit of this solution would then be that the AA could be split in as many subparts as there are TAs or (R)AN nodes, and misuse becomes almost impossible as every change has to go through the operator. However, with, for example, many stationary Internet of Things (IoT) devices, this approach may become a heavy operations and maintenance (O&M) task for the operator, and knowing the exact location of operation for each device at the time of selling the subscription may not always possible. Additionally, for UEs allowed to roam, it may be difficult to know the TAs or (R)AN nodes in an allowed area in a visited network. Thus, this approach may not be a feasible solution for defining the TAs or (R)AN node IDs area of an AA.

A second solution would be to assign the UE a number of allowed subparts in the AA and the number of allowed TAs or (R)AN nodes per subpart at registration. This registration information could be provided by the UDM and optionally adjusted by the NG PCF. The UE would be allowed to register anywhere but only be allowed to use data services in TAs or (R)AN nodes included in the AA. To add TAs or (R)AN node IDs to the AA, the user would, via configuration, first have to start the procedure, identify the subpart to use, and then after each concluded registration attempt either accept or reject adding of the current TA or (R)AN node IDs to the identified subpart of the AA. The TAs or (R)AN node IDs would then also need to be stored in the subscription database (UDM). Adding of new TAs or (R)AN node IDs may continue until either the maximum number of TAs is added or the user, via configuration, stops the definition procedure or starts the definition procedure for another subpart of the AA. In non-accepted TAs, the UE will not be allowed to use data services, and service requests or similar requests will be rejected as well as MT data. At registration, the UE may be provided with the stored definition of its AA. This may be provided from the UDM via the AMF to the UE whenever subscription data is fetched from the subscription database. It may be possible to include TAs or (R)AN node IDs from both the home network and from visiting networks in the definition of an AA. The home operator may correct TAs or (R)AN node IDs added by mistake changing the stored AA.

One benefit with this second solution is that the AA is defined by the end user and adding TAs or (R)AN node IDs must be acknowledged by the end user (i.e. intentional). As in the previous solution, an AA could be split in as many subparts as there are TAs or (R)AN node IDs, and misuse becomes almost impossible as every correction has to go through the operator. However, letting the end user start the procedure and then acknowledge every TA or (R)AN node ID may be too cumbersome for some users. There is also a risk that TAs or (R)AN node IDs are incorrectly added due to the prospect of getting service in the current location, while instead the scarce number of accepted TAs or (R)AN node IDs should have been saved for more precious locations.

In order to minimize the cost of deployment for simple IoT devices, manual intervention should be kept to a minimum, and defining AAs for such devices should be done automatically, e.g. starting the definition procedure for their only area at registration and then automatically accepting any additional TAs or (R)AN node IDs until the maximum number of TAs or (R)AN node IDs are reached. If the IoT device should be moved to another location, the AA needs to be reset which requires an operator intervention.

However, as seen from above, the second solution provides a risk of there being a substantial number of incorrect AA definitions, calls to helpdesk, and operator intervention to correct the AA definitions. Thus, for the reasons given above the second solution is also probably not an acceptable solution.

A third solution, provides for an automatic DAA list definition procedure by starting the definition procedure each time a UE registers, and then accepting every new TA or (R)AN node ID until the maximum number of TAs or (R)AN node IDs is reached. The maximum number of TAs or (R)AN node IDs is provided by the UDM, and optionally adjusted by the PCF. Once the DAA list is completely defined (i.e., the number of elements in the list (e.g., the number of TAs or (R)AN node IDs in the list) is equal to the max list size), the UE will be rejected when trying to register while the UE is in a new TA or (R)AN node. When a TA or (R)AN node ID is added by mistake, the mistake can be taken care of by, for example, deregistration and then re-registration (another alternative is a specific reset message from the UE—a.k.a., the DAA list reset request message) whereby the DAA list is rest. Upon the change of a CN node for the UE, the DAA list for the UE (as well as a static AA (SAA) list for UE, if one exists) may be transferred from old to new node if an interface exists, otherwise the UE will (as in legacy) be forced to re-register. Allowed TAs or (R)AN node IDs may be served by different CN nodes.

The benefit of this third solution is that it is easy from an operation and maintenance perspective. However, one drawback is that a user may get service anywhere as long as the user performs deregistration and then re-registration (or reset). On the other hand, this makes it possible to use several disjoint allowed areas, e.g. for nomadic DSL replacement with one area for the primary residence and another area for the summer house.

Thus, under the third automatic DAA list definition procedure, a solution is needed for making it possible for the operator to control the frequency of DAA list reset, thereby offering a counter measure against UEs that are trying to use a less expensive subscription with limited service area as a subscription without service area restrictions (e.g. a mobile broadband subscription).

According to some embodiments, either the AMF or PCF (or a combination thereof) records DAA list reset attempts from the UE. If the frequency of the attempts reaches a configured threshold, a quarantine time may be set, and during that quarantine time any reset attempts by the UE are rejected and the previously defined DAA list is not reset. Other criteria for rejecting a reset may also be provided, e.g., based on a combination of subscription type and frequency or based on reset attempts made in various geographical locations indicating that a UE supposed to be semi-static is not at all having such a mobility pattern. The length of the quarantine time (which could vary from zero to infinity) could be dynamically set, e.g. based on if the fraud attempts are repeated.

Some benefits of the embodiments disclosed herein is that they give the operator a tool to control the change rate of a UE's DAA list while still keeping the advantages of automatically updating the DAA list for the UE (i.e. without involvement of the operators O&M personnel). Alternatively, without such control, it may be possible for users to use a cheaper subscription while still using it in the same way as, for example, for a mobile broadband (MBB) subscriber.

The granularity of the DAA list may be, for example, one or more of TA, R(AN) node area, or cell level. That is, the DAA list may be a list of tracking areas, a list of node IDs, or a list of cell IDs. For a dynamic allocation, the UE may propose and the network decides which TA(s), R(AN) node areas, and/or cell(s) area to be included in the DAA list by the UE visited areas and for which the UE performs a Registration. The dynamic allocated allowed area may be captured by AMF, and is thus incrementally included in the DAA list dependent of the occurred UE mobility.

According to some embodiments, upon a UE triggered Detach Request (or a UE request for Reset, such as a DAA list Reset Request, or a deregistration message) and/or a network triggered Reset, the network (AMF or PCF, or a combination of AMF and PCF) may decide whether the DAA list should be reset. If the DAA is not reset, two aspects may be considered: (i) place for storage of the DAA list and (ii) a quarantine time.

With respect to the place of storage of the DAA list, the storage location may be in, for example, an AMF, in a serving PCF, or in a Network Repository Function in Data Layer architecture (NRF). For example, in some embodiments, the PCF may send its storage handling support capabilities to the AMF, or the PCF capabilities may be configured in AMF. In some embodiments, the final decision as to the place of storage of the DAA list may be made by the AMF. In embodiments in which there exits not only a DAA list for a UE, but also a static AA information for the UE (e.g., a static AA (SAA) list), the DAA list and the static AA information are stored together. The combination of a DAA list and static AA information for a UE is referred to as the UE's Complete AA (CAA).

With respect to the quarantine time, the DAA list may have a related quarantine time. The quarantine time may be determined by one or more of, for example, an AMF, PCF or UDM, and specifies the time (e.g. date/timestamp, hours, or other timeframe) during which the DAA list may not be reset by the UE. The determination of blocking and quarantine time setting could be based on one or more criteria. For example, if the frequency of the UE reset attempts reaches a configured threshold, a quarantine time may be set and during that time any reset attempts are rejected. Other criteria for rejecting a reset are also possible, and may be, for example, based on a combination of subscription type and frequency or based on reset attempts made in various geographical locations indicating that a UE that is supposed to be semi-static is not at all having such a mobility pattern. The length of the quarantine time (which may vary from zero to infinity) may be dynamically set, for example, based on if the fraud attempts are repeated.

The quarantine time may be seen as a kind of back-off timer for the UE with respect to reset of the DAA list. After expiry of the quarantine time, the DAA list is reset at next UE triggered reset (e.g. via Deregistration (Detach) or specific reset signalling). At the next UE registration or at the UE receiving a Reset response, a new DAA list may be provided to the UE. The UE may then start adding new TA(s), R(AN) node, or cell(s) areas to its DAA list.

As an alternative to UE triggered reset of the DAA list, the network (e.g. UDM, PCF, or AMF) may also trigger a reset of the DAA list. A network triggered reset of the DAA list may not necessarily be limited by the quarantine time. However, it may however influence the mechanism for calculation and usage of the quarantine time.

In some embodiments, the solutions described herein may be applicable for 5G and 4G networks, but is not necessarily limited to those. For 4G networks, AMF functionality is handled by MME, PCF functionality is handled by PCRF, and UDM functionality is handled by HSS/HLR.

Figure 3:
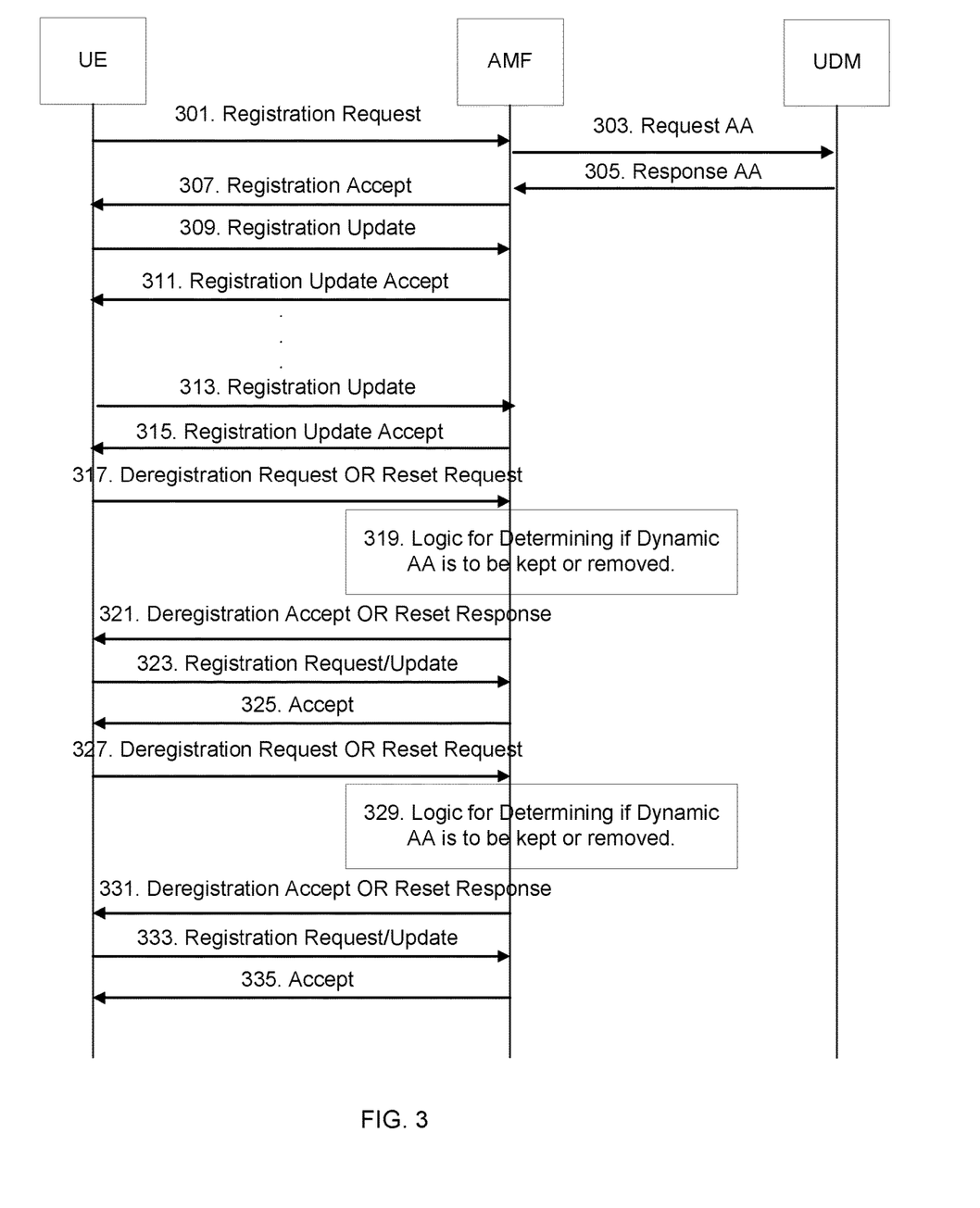
FIG. 3 illustrates a sequence diagram, according to some embodiments.

FIG. 3 illustrates a message flow diagram, according to some embodiments. As shown in FIG. 3, DAA list reset logic is located in the AMF node. For example, AMF may determine whether to reset a DAA list for a UE in response to receiving from the UE a message indicating a request for a reset of the DAA list.

301. The UE initially registers to the network by transmitting a registration request to the AMF. The registration request may comprise the current TA of the UE (e.g., TA1).

303-305. The AMF fetches subscription information from the UDM by transmitting a request 303 to the UDM and receiving a response 305 from the UDM comprising subscription information for the UE. The subscription information may comprise, for example, information indicating the maximum allowed size of the UE's DAA list (e.g., information indicating the maximum number of TAs that may be included in the UE's DAA list). For ease of illustration, we may assume that the maximum size of the DAA list is for the UE in FIG. 3 is two. The subscription information may further comprise, for example, static AA information for the UE, such an SAA list as well as other information (e.g., a black list of TA(s), forbidden list of TA(s), non-allowed TA(s), allowed TA(s), etc.). The AMF may store the maximum size value as well as the static AA information.

For example, in the instance shown in FIG. 3 where the UE registers for the first time to the network in 301, and the number of TA(s) in the UE's DAA list has not reached the maximum number of allowed TA(s) (i.e., the size of the DAA list is below it maximum allowed size), the AMF may add the TA indicated in the registration request message 301 (e.g., TA1) to the DAA list for the UE. The AMF may further store the DAA list for the UE (e.g., DAA list=[TA1]).

307. The AMF transmits a registration accept message to the UE. The registration accept message may comprise the CAA for the UE (as discussed above the CAA comprises the DAA list and the static AA information for the UE). The UE may store the CAA. By storing its CAA, the UE thereby knows that it needs to perform a registration update (similar to a tracking area update (TAU)) when it moves into a new TA that is not indicated as being an allowed TA (e.g., the new TA is not included in the DAA list or other TA whitelist).

309. If the UE moves to such a new TA, the UE transmits a registration update to the AMF. The registration update may comprise a new TA of the UE (i.e., TA2).

311. In the example shown in FIG. 3, since the maximum number of TA(s) allowed in the DAA list is two and the DAA list currently includes only a single TA (i.e., TA1), the AMF will add the new TA (i.e., TA2) indicated in the registration update message 309 to the current DAA list for the UE (e.g., DAA list=[TA1, TA2]). The AMF will then transmit a registration update accept message 311 to the UE, the message 311 comprising the updated DAA list (i.e., [TA1, TA2]). More specifically the message may comprise the CAA for the UE, which includes the updated DAA list.

As indicated by the ellipses, in scenarios where the maximum number of TA(s) is greater than two as described in this example, the UE may continue to build up its DAA list until the maximum number of TA(s) has been reached. While TA(s) are used in FIG. 3, the DAA list may be built based on other criteria in alternative to or in addition to TA(s), such as R(AN) node area(s) and/or cell(s) area to be included in the DAA list. The UE may continue to build up the DAA list until, for example, the maximum TA(s), R(AN) node area(s), and/or cell(s) area is reached.

313. If the UE moves to a new TA outside of its defined AAs, the UE transmits a registration update message to the AMF. The registration update may comprise a new current TA of the UE (TA3).

315. Since the maximum number of TA(s) for the DAA list for the UE (two) has already been met when the AMF added the TA1 and TA2 to the DAA list, the AMF will enforce the maximum number of TA(s) and will not add to the DAA list TA3 indicated in message 313. Alternatively, the AMF may indicate that TA3 as "not allowed" or the like in the DAA list. Thus, while the AMF may allow the UE to register while the UE is in TA3, the AMF will not allow the UE to get service while the UE is in TA3 because the DAA list has already reached its maximum size. Thus, the AMF may transmit a registration update accept message 315, but the registration update accept message 315 may indicate that the UE will not receive any data services from the network.

317. Having reached the maximum number of allowed TA(s) for the DAA list, and having no service in TA3, the UE may transmit to the AMF a message indicating a request for a DAA list reset (e.g., a detach request, a deregistration request, a DAA list reset request, etc). In some embodiments, the AMF or another network node (e.g., PCF), stores the number of times such a message is transmitted by the UE.

319. In response to receiving the message transmitted by the UE in step 317, the AMF decides if the DAA list for the UE should reset. As described above, the AMF may base its decision as to whether or not to reset the DAA list based on, for example, one or more of the frequency of the deregistration/reset attempts reaching a threshold, a combination of subscription type and frequency of reset attempts, or resent attempts in various geographical locations. If AMF decides to not reset the DAA list, the AMF may decide (a) a place for storage of the DAA list and (b) a quarantine time. The AMF may store the DAA list in, for example, the AMF, the PCF, or the NRF. The quarantine time may be dynamically determined or obtained based on, for example, the frequency of the reset attempts, a combination of subscription type and frequency of reset attempts, or resent attempts in various geographical locations. In the example shown in FIG. 3, the AMF decides to not reset the DAA list, stores the DAA list, and obtains a quarantine time (e.g., determines the quarantine time or receives the quarantine time from another node (e.g., PCF)).

321. AMF sends a response message to the UE (e.g., a deregistration response or reset request response depending on the type of message the UE sent in step 317). In the event that in step 319 the AMF decides to "keep" the DAA list (i.e., the AMF decides to not reset the DAA list), the response sent in step 321 may comprise a quarantine time and DAA list. As noted above, the quarantine time may specify a time period where any reset requests of the DAA list by the UE will be rejected. Thus, during the quarantine time, any reset attempts by the UE may be rejected and the previously defined DAA list is kept. Upon expiration of the quarantine time, the previously defined/stored DAA list may be removed at the next UE triggered reset (e.g., message 303) or the next UE registration (309).

323. The UE may send a registration request (in the case where the UE deregisters from the network at 317-321) or a registration update (in the case where the UE initiates DAA list reset signaling at 317-321) to the AMF, the registration request comprising the current TA of the UE (e.g., TA3). Preferably, in the case where in step 319 the AMF decided to not reset the DAA list and the AMF sent to the UE in step 321 the quarantine time, the UE waits until the quarantine time expires before transmitting a DAA list reset request.

325. In step 325 the AMF transmits a response to the registration message sent in step 323. Assuming the registration message sent by the UE in step 323 indicates that the UE is in TA3, the AMF should indicate in the response sent in step 325 that the UE will not receive service because TA3 is not indicated in the UE's CAA as being an allowed area (i.e., TA3 is not in the DAA list for the UE or the SAA list for the UE, if any).

327. Having no service in TA3, the UE may transmit to the AMF yet another message indicating a request for a DAA list reset, as described above in connection with message 317 in order to reset the DAA list so that TA3 may be added to the DAA list.

329. In response to receiving the message sent in step 327, the AMF determines if the DAA list is to be kept (i.e., AMF decides whether or not to reset the DAA list). Assuming that the quarantine time specified at 319 and 321 has passed, then the AMF will reset the DAA list (e.g., DAA list=[null]). The AMF may further store the reset DAA list.

331. The AMF transmits to the UE a response message (e.g., deregistration accept or reset response as the case may be). The message 331 may comprise the CAA for the UE, which in this scenario may comprise any static information (e.g., from the UDM) and an empty DAA list (e.g., a DAA list with a null set of TA(s)). Since the AMF reset the DAA list at 329, message 331 may not include a quarantine time, or may optionally include a quarantine time of zero.

333. The UE may transmit to the AMF a registration request (e.g., in the case where the UE deregisters in 327) or a registration update request (e.g., in the case where the UE transmits a DAA list reset request in 327), the registration request comprising TA3.

335. Assuming the maximum DAA list size of the UE is still two, and since the DAA list for the UE has been reset and now contains zero TA(s), the AMF may add the third TA to the DAA list and store the DAA list (e.g., DAA list=[third TA]). The AMF may further transmit a registration accept or update accept message 335, which may comprise the current CAA, including the newly defined DAA list (e.g., DAA list=[third TA]).

Figure 4:
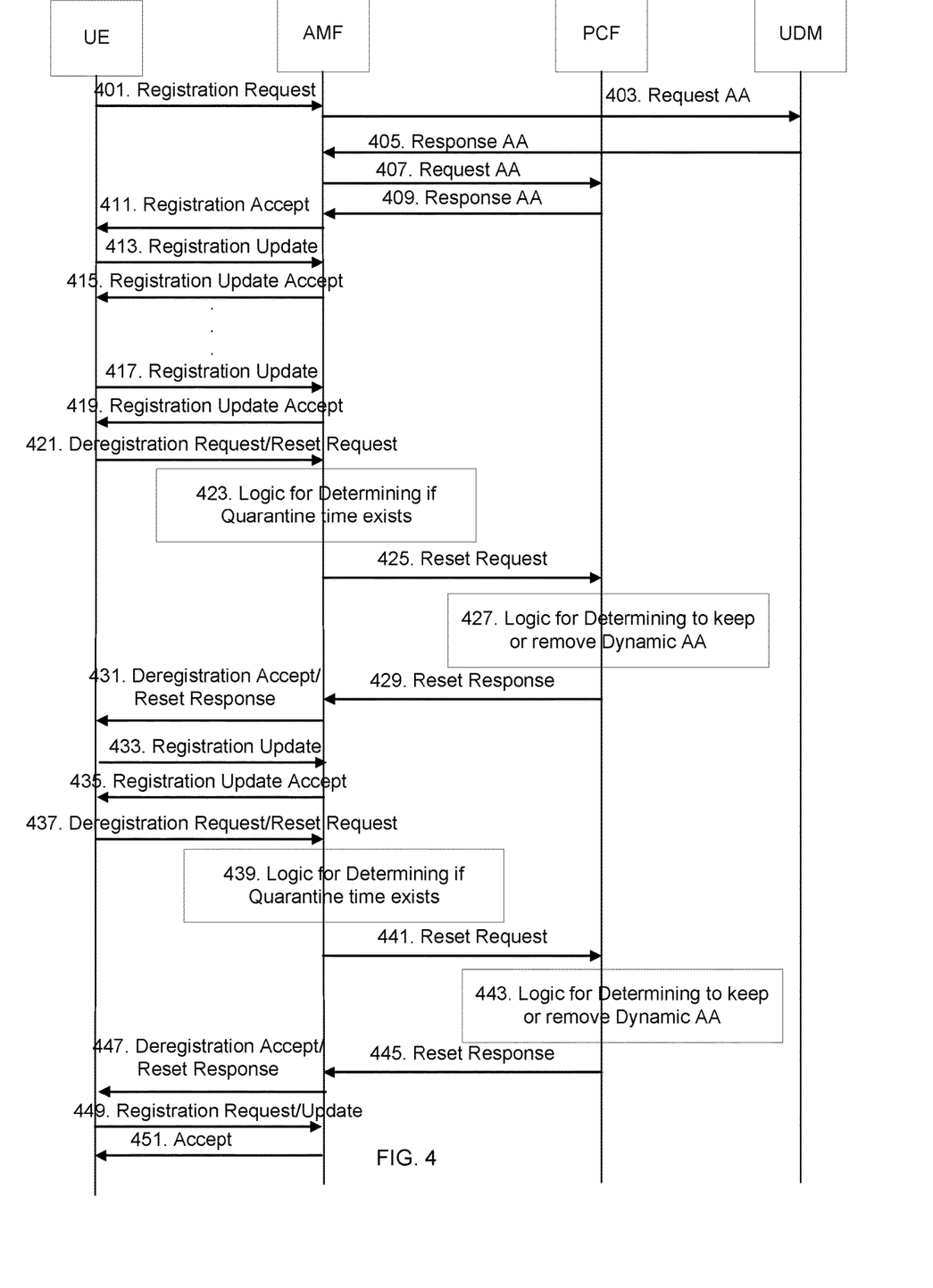
FIG. 4 illustrates a sequence diagram, according to some embodiments.

FIG. 4 illustrates a sequence diagram, according to some embodiments. FIG. 4 depicts an embodiment where handling logic is stored in the PCF.

401. The UE initially registers to the network by transmitting a registration request to the AMF. The registration request may comprise the current TA of the UE ("first TA" or "TA1").

403-405. The AMF fetches subscription information from the UDM by transmitting a request 403 to the UDM and receiving a response 405 from the UDM comprising subscription information for the UE, which as described above with respect to steps 303-305, includes the UE CAA and the UE's DAA list maximum size.

407. The AMF may in turn transmit a request message to the PCF for any modifications to the CAA and/or maximum DAA list size. The request message 407 from the AMF to the PCF may comprise the CAA and/or the maximum DAA list size, as obtained by the AMF from the UDM.

409. The PCF transmits to the AMF a response 409 that comprises maximum DAA list size as well as the CAA for the UE, the CAA which further comprises a current DAA list for the UE. In some embodiments, the PCF may modify the CAA information, such as, for example, enhance or enlarge the maximum DAA list size. For ease of illustration, we may assume that response 409 indicates that the maximum DAA list size remains two, and that there are no current TA(s) in the DAA list.

411. The AMF then determines whether the first TA may be added to the DAA list. For example, in the instance shown in FIG. 4 where the UE registers for the first time to the network in 401, and the number of TA(s) in the UE's DAA list has not hit the maximum number of allowed TA(s), the AMF may add the first TA (TA1) indicated in the registration request message 401 to the current DAA list for the UE. The AMF may further store the DAA list for the UE as it is currently defined (e.g., DAA list=[TA1]). The AMF may transmit to the UE a registration accept message 411 comprising the CAA, which in turn comprises the DAA list (including the first TA). The UE may store its CAA. By storing its CAA, the UE thereby knows that it needs to perform a registration update (similar to a tracking area update (TAU)) when it moves into a new TA outside of its AAs.

413. If the UE moves to a new TA outside of its defined AAs, the UE transmits a registration update to the AMF. The registration update may comprise a new, second current TA of the UE ("second TA" or "TA2").

415. In the example shown in FIG. 4, since the maximum DAA list size of the UE has not been met (two), the AMF will add the second TA indicated in the registration update message 309 to the current DAA list for the UE (e.g., DAA list=[TA1, TA2]). The AMF will then transmit a registration update accept message 415 to the UE, the message 415 comprising the current CAA, the CAA further comprising the DAA list updated to include the first TA indicated in message 401 and the second TA indicated in message 413.

As indicated by the ellipses, in scenarios where the maximum number of TA(s) is greater than two as described in this example, the UE may continue to build up its DAA list until the DAA list reaches its maximum size (e.g., the maximum number of TA(s) included in the list has been reached). While TA(s) are used in FIG. 4, the DAA list may be built based on other criteria in alternative to or in addition to TA(s), such as R(AN) node area(s) and/or cell(s) area to be included in the DAA list. The UE may continue to build up the DAA list until, for example, the maximum TA(s), R(AN) node area(s), and/or cell(s) area is reached.

417. If the UE moves to a new TA outside of its defined AAs, the UE transmits a registration update message 417 to the AMF. The registration update may comprise a new current TA of the UE ("third TA" or "TA3").

419. Since the maximum number of TA(s) for the DAA list for the UE (two) has already been met when the AMF added the first TA and second TA to the DAA list, the AMF will enforce the maximum number of TA(s) and will not add the third TA indicated in message 417 to the DAA list. Alternatively, the AMF may indicate the third TA as "not allowed" or the like in the DAA list. Thus, while the AMF may allow the UE to register in the third TA, the AMF will not allow the UE to get service in the third TA because it is not included in its AAs. Thus, the AMF may transmit a registration update accept message 419, but the registration update accept message 419 may comprise the complete DAA list (e.g., without the third TA, or indicating the third TA as, for example, a non-allowed area).

421. Having reached the maximum number of allowed TA(s) for the DAA list, and having no service in the third TA, the UE may transmit to the AMF a message indicating a request for a reset of the UE's DAA list. In some embodiments, the AMF or another network node (e.g., PCF), stores the number of times such a request is indicated by the UE.

423. In response to receiving the message indicating the request for the reset of the DAA list, the AMF determines if a quarantine time already exists. If a quarantine time already exists, and the message 421 is received within the quarantine time, the AMF will keep the DAA list (e.g., reset rejected).

425. Assuming in the example in FIG. 4 that no quarantine time already exists at the AMF, the AMF will transmit a reset request 425 to the PCF. The reset request may comprise the currently defined DAA list as it is stored at the AMF.

427. The PCF contains logic for determining whether to reset the DAA list. As with the AMF, if a quarantine time already exists at the PCF, and the reset request 425 is received within the quarantine time, the PCF will decide to keep the DAA list (e.g., reset rejected). Alternatively, if there is no existing quarantine time, and/or an existing quarantine time has already expired, the PCF will decide whether to keep or reset the DAA list based on, for example, one or more of the frequency of the deregistration/reset attempts reaching a configured threshold, a combination of subscription type and frequency of reset attempts, or resent attempts in various geographical locations. If PCF decides to keep the DAA list, the PCF may decide (a) a place for storage of the DAA list (e.g., in the PCF) and (b) a quarantine time. The quarantine time may be dynamically determined or obtained based on, for example, the frequency of the reset attempts, a combination of subscription type and frequency of reset attempts, or resent attempts in various geographical locations. In the example shown in FIG. 4, the PCF decides to keep the DAA list, stores the AA, and determines or obtains a quarantine time.

429. The PCF transmits a reset response 429 to the AMF, the reset response comprising (i) a result of the determination of whether to keep or reset the DAA list (in this example, we assume that PCF's indicates "keep" the DAA list), (ii) a quarantine time, and (iii) a CAA (in the case where the DAA list is kept, the CAA comprises the previously defined DAA list, and in the case where the DAA list is reset, the CAA may comprise an empty DAA list (e.g., DAA list=[null] or no DAA list).

431. The AMF may store the result (e.g., whether to keep or reset the DAA list) in message 429, may replace its old CAA/store the CAA indicated in message 429, and store the quarantine time indicated in message 429. The AMF then transmits a response 431 to the UE indicating whether or not the DAA list has been reset. The response 431 may comprise the quarantine time and the CAA, the CAA comprising the previously defined/kept DAA list. As noted above, the quarantine time may specify a time period where any reset requests of the AA by the UE will be rejected. Thus, during the quarantine time, any reset attempts by the UE may be rejected and the previously DAA list is kept.

433. The UE may send a registration request (in the case where the UE deregisters from the network at 421) or a registration update (in the case where the UE initiates DAA list reset signaling at 421) to the AMF, the registration request comprising the current TA of the UE (e.g., a third TA). Preferably, in the case where a decision was made to not reset the DAA list and the UE waits until a quarantine time expires before transmitting a DAA list reset request for requesting a reset of the UE's DAA list.

435. The AMF may refer to the stored DAA list and determine that the third TA cannot be added to the DAA list (e.g., because the maximum number of TA(s) for the DAA list has been reached). However, the AMF may allow the UE to register in the third TA indicated in message 435, but not allow the UE to get service in that TA because it is not included in its AA. Thus, the AMF may transmit a registration update accept/registration accept message 435, but the accept message 435 may comprise the DAA list (e.g., without the third TA, or indicating the third TA as, for example, a non-allowed area).

437. Having no service in the third TA, the UE may transmit to the AMF yet another message indicating a request for a reset of the DAA list (e.g., deregistration request or reset request), as described above in connection with message 421 in order to reset the DAA list.

439. As similarly described in connection with 423 above, the AMF determines if a quarantine time already exists. If a quarantine time already exists, and the message 437 is received within the quarantine time, the AMF will keep the DAA list (e.g., reset rejected). As noted above, in this example the AMF will have received a quarantine time in message 429, and thus may check in 439 if the quarantine time has expired.

441. Assuming in the example in FIG. 4 that the quarantine time has expired, the AMF will transmit a reset request 441 to the PCF. The reset request may comprise the currently defined DAA list as it is stored at the AMF.

443. The PCF contains logic for determining whether to keep or reset the DAA list. As with the AMF, if a quarantine time already exists at the PCF, and the reset request 443 is received within the quarantine time, the PCF will decide to keep the DAA list (e.g., reset rejected). Alternatively, if there is no existing quarantine time, and/or an existing quarantine time has already expired, the PCF will decide whether to keep or reset the DAA list based on, for example, one or more of the frequency of the deregistration/reset attempts reaching a configured threshold, a combination of subscription type and frequency of reset attempts, or resent attempts in various geographical locations. In the example shown in FIG. 4, the PCF decides to reset the DAA list.

445. The PCF transmits a reset response 445 to the AMF, the reset response comprising (i) a result of the determination of whether to keep or reset the DAA list (in this example, we assume that PCF's indicates "reset" the DAA list), (ii) a CAA (in the case where the DAA list is reset, the CAA comprises an empty DAA list (e.g., DAA list=[null] or no DAA list), and (iii) optionally a quarantine time (e.g., zero).

447. In response to receiving message 445, the AMF may reset its stored DAA list (e.g., DAA list=[null]) and store the reset DAA list as well as the result of resetting the DAA list. The AMF transmits to the UE a deregistration accept or reset response 447, as the case may be. The message 447 may comprise the CAA, which in this scenario may comprise any static information (e.g., from the UDM) and an empty DAA list (e.g., a DAA list with a null set of TA(s)). Since the PCF decided to reset the DAA list at 443, message 447 may not include a quarantine time, or may optionally include a quarantine time of zero.

449. The UE may transmit to the AMF a registration request (e.g., in the case where the UE deregisters in 437) or a registration update request (e.g., in the case where the UE transmits a reset request in 437), the registration request comprising a third TA ("TA3").

451. Assuming the maximum DAA list size of the UE is still two, and since the DAA list for the UE has been reset and now contains zero TA(s), the AMF may add the third TA to the DAA list and store the DAA list (e.g., DAA list= [TA3]). The AMF may further transmit a registration accept or update accept message 451 to the UE, which may comprise the current CAA, including the newly defined DAA list (e.g., DAA list=[TA3]).

It should be appreciated that any combinations in between FIGS. 3 and 4, e.g. where the PCF and AMF split control handling, are possible, particularly where the place for storage may be a NRF.

Figure 5:
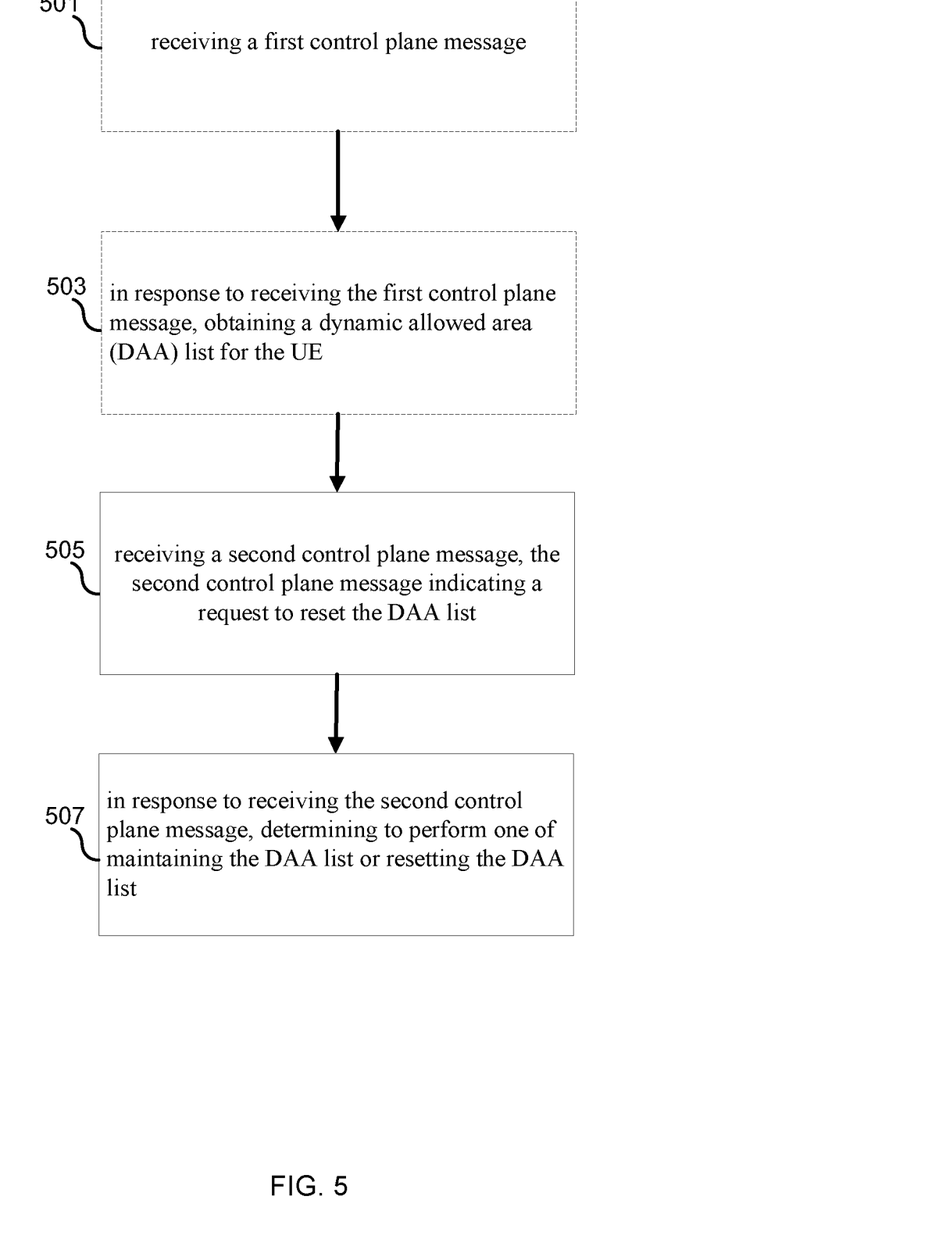
FIG. 5 illustrates an embodiment of a process.

FIG. 5 illustrates an embodiment of a process. In some embodiments, the process is performed by a control node, such as an AMF or PCF. The dashed lines around steps 501 and 503 indicate that the process may optionally skip steps 501 and 503, and start at step 505 instead of step 501.

At 501, a first control plane message is received. In some embodiments where the network node is an AMF, the first control plane message may comprise a registration request (301, 401) described above in connection with FIGS. 3-4. In embodiments where the network node is a PCF, the first control plane message may comprise a request 407 as shown in FIG. 4.

At 503, in response to receiving the first control plane message, the network node obtains a dynamic allowed area (DAA) list for the UE. The DAA list may comprise, for example, a list of zero or more TA(s) included in a dynamic allowed area for a UE. In some embodiments where the network node is an AMF, the AMF may obtain the DAA list from its internal storage, a UDM, a PCF, or some other storage location. In some embodiments where the network node is a PCF, the PCF may obtain an allowed area from local storage or another network node.

At 505, the network node receives a second control plane message, the second control plane message indicating a request for a reset of the DAA list. In embodiments where the network node is an AMF, the second message may be a deregistration request or reset request (317) transmitted by a UE. In embodiments where the network node is a PCF, the second message may be a reset request (425) transmitted by an AMF.

At 507, the network node, in response to receiving the second message, determines to perform one of maintaining the DAA list or resetting the DAA list. In embodiments where the network node is an AMF, the AMF may contain logic 319, 329, for such a determination as described above in connection with FIG. 3. In embodiments where the network node is a PCF, the PCF may contain logic 427, 443, for such a determination as described above in connection with FIG. 4.

Figure 6:
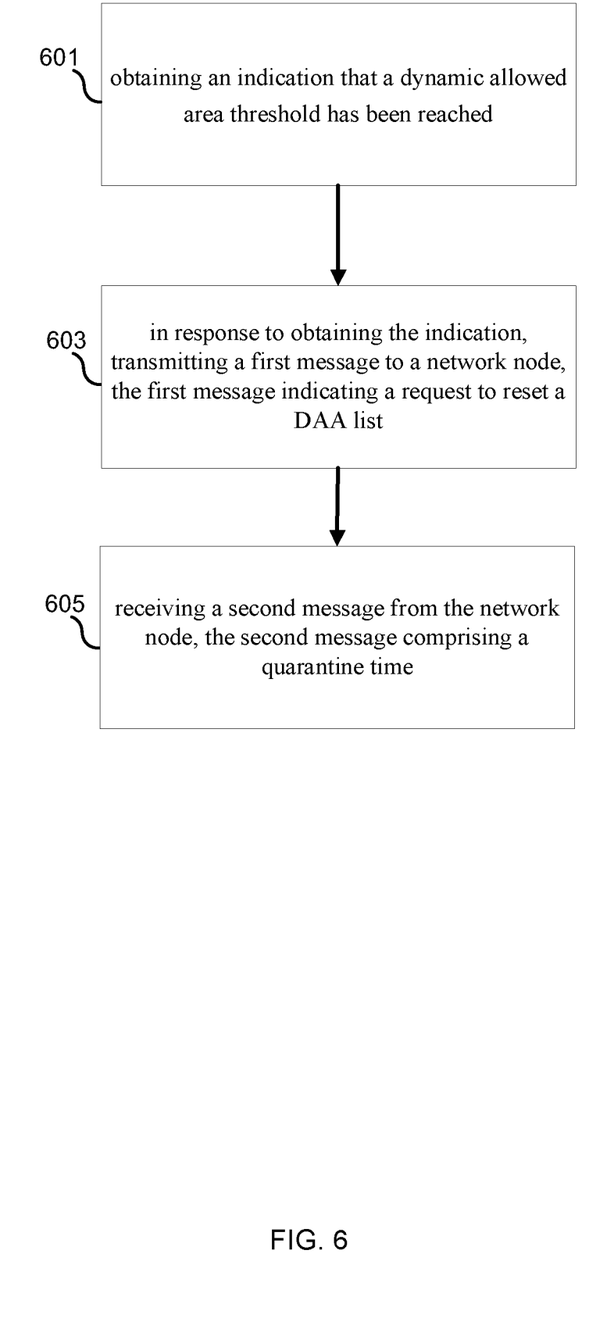
FIG. 6 illustrates an embodiment of a process.

FIG. 6 illustrates an embodiment of a process. In some embodiments, the process is performed by a UE.

At 601, the UE obtains an indication that a dynamic allowed area threshold has been reached. In some embodiments, the indication may comprise receiving a message from an AMF (e.g., 315, 325, 419, 435) denying service for the UE in a specific TA, etc.

At 603, in response to obtaining the indication, the UE transmits a first message to a network node, the first message comprising a request to reset a dynamic allowed area (DAA) list.

In some embodiments, the message may comprise a deregistration request message or a reset request message as described above in connection with FIGS. 3-4 (e.g., 317, 327, 421, 437).

At 605, the UE receives a second message from the network node, the second message comprising a quarantine time. As described above, the quarantine time may indicate, for example, a time period during which a request for a reset of the DAA list will be denied. As also discussed above, it is preferred that the UE waits until the quarantine time expires before transmitting to the network node a DAA list reset request requesting a reset of the DAA list.

Figure 7:
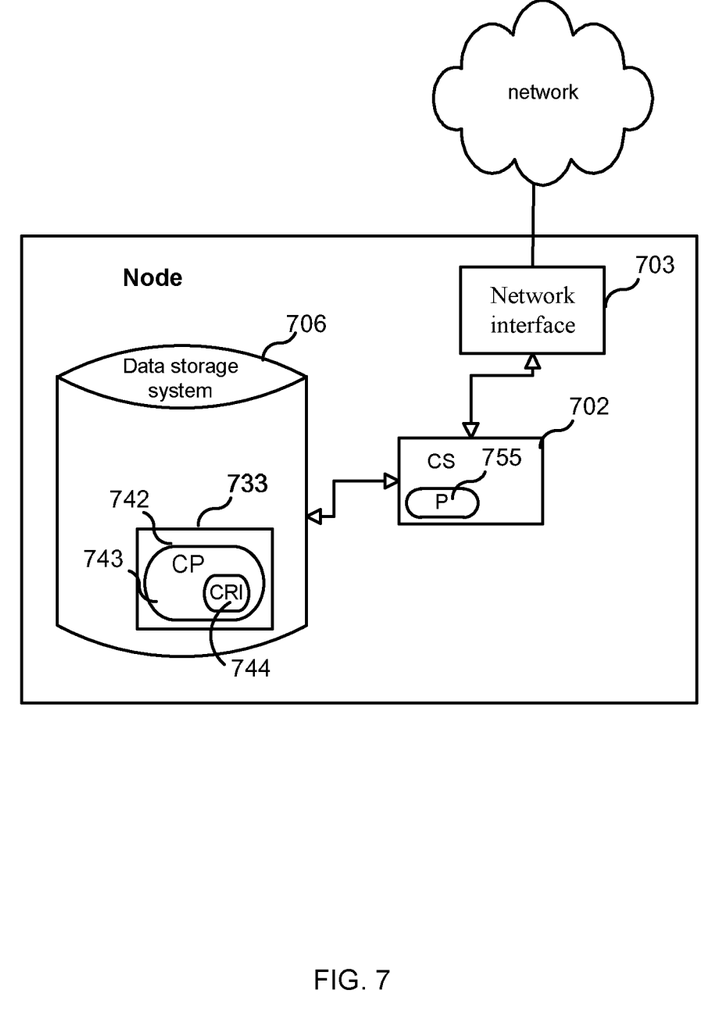
FIG. 7 illustrates a block diagram of an exemplary network node, according to some embodiments.

FIG. 7 illustrates a block diagram of an exemplary network node such as the AMF or the PCF node. As shown in FIG. 7, the network node may include or consist of: a computer system (CS) 702, which may include one or more processors 755 (e.g., one or more general purpose microprocessors and/or one or more circuits, such as an application specific integrated circuit (ASIC), field-programmable gate arrays (FPGAs), a logic circuit, and the like); a network interface 703 for use in connecting the network node to a network 110; and a data storage system 706, which may include one or more non-volatile storage devices and/or one or more volatile storage devices (e.g., random access memory (RAM)). In embodiments where the network node includes a microprocessor, a computer program product (CPP) 733 may be provided. CPP 733 includes or is a computer readable medium (CRM) 742 storing a computer program (CP) 743 comprising computer readable instructions (CRI) 744. CRM 742 is a non-transitory computer readable medium, such as, but not limited, to magnetic media (e.g., a hard disk), optical media (e.g., a DVD), solid state devices (e.g., random access memory (RAM), flash memory), and the like. In some embodiments, the CRI 744 of computer program 743 is configured such that when executed by computer system 702, the CRI causes the network node to perform steps described above (e.g., steps described above with reference to the flow charts and message flows shown in the drawings). In other embodiments, the network node may be configured to perform steps described herein without the need for a computer program. That is, for example, computer system 1302 may consist merely of one or more ASICs. Hence, the features of the embodiments described herein may be implemented in hardware and/or software.

Figure 8:
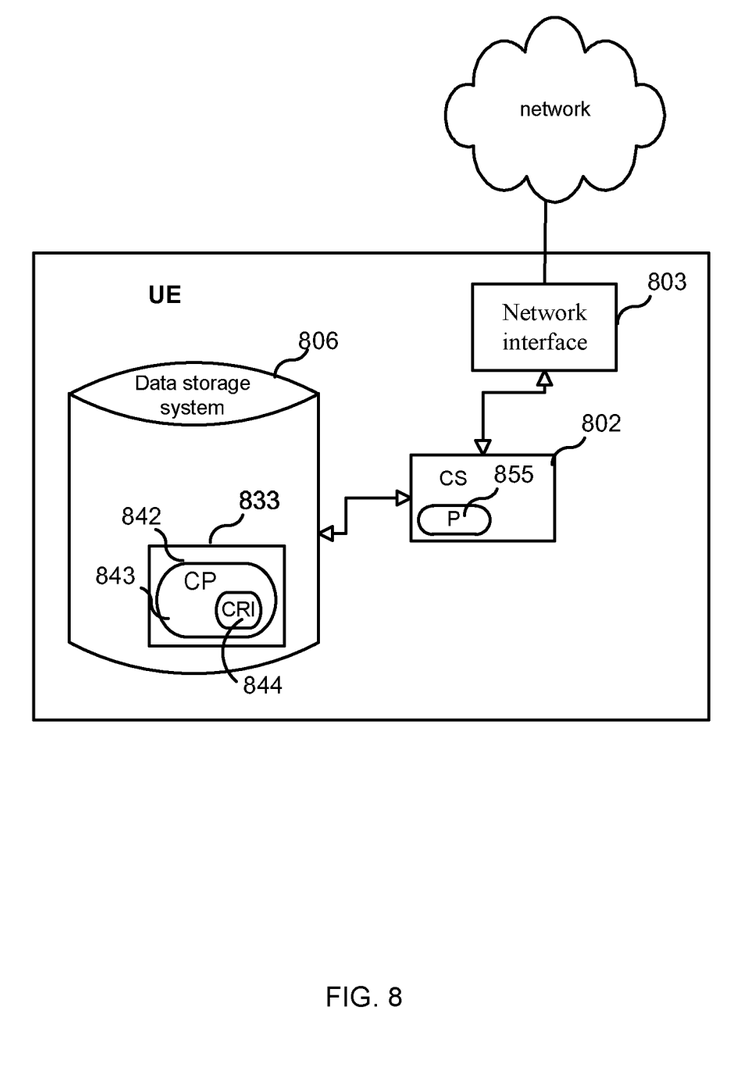
FIG. 8 illustrates a block diagram of an exemplary user equipment, according to some embodiments.

FIG. 8 illustrates a block diagram of an exemplary user equipment (UE). As shown in FIG. 7, the UE may include or consist of: a computer system (CS) 802, which may include one or more processors 855 (e.g., one or more general purpose microprocessors and/or one or more circuits, such as an application specific integrated circuit (ASIC), field-programmable gate arrays (FPGAs), a logic circuit, and the like); a network interface 803 for use in connecting the UE to a network; and a data storage system 806, which may include one or more non-volatile storage devices and/or one or more volatile storage devices (e.g., random access memory (RAM)). In embodiments where the UE includes a microprocessor, a computer program product (CPP) 833 may be provided. CPP 833 includes or is a computer readable medium (CRM) 842 storing a computer program (CP) 843 comprising computer readable instructions (CRI) 844. CRM 842 is a non-transitory computer readable medium, such as, but not limited, to magnetic media (e.g., a hard disk), optical media (e.g., a DVD), solid state devices (e.g., random access memory (RAM), flash memory), and the like. In some embodiments, the CRI 844 of computer program 843 is configured such that when executed by computer system 802, the CRI causes the UE to perform steps described above (e.g., steps described above with reference to the flow charts and message flows shown in the drawings). In other embodiments, the UE may be configured to perform steps described herein without the need for a computer program. That is, for example, computer system 802 may consist merely of one or more ASICs. Hence, the features of the embodiments described herein may be implemented in hardware and/or software.

CONCISE DESCRIPTION OF EMBODIMENTS

A. Network Node Embodiments

1. A method for reset of a dynamic allowed area (DAA) list for a user equipment (UE), the method comprising:
receiving a control plane message (e.g. deregistration request or reset request), the message indicating a request for a reset of the DAA list; and,
in response to receiving the control plane message, determining to perform one of maintaining the DAA list or resetting the DAA list.

2. The method of embodiment 1, further comprising:
receiving a second control plane message (e.g., registration request);
in response to receiving the second control plane message, obtaining the allowed area for the UE.

3. The method of embodiment 1, wherein the determining comprises evaluating one or more of: whether a number of attempts by the UE to reset the DAA list has reached a threshold; a combination of subscription type and frequency of attempts by the UE to reset the DAA list; and a number of attempts by the UE to reset the DAA list in one or more geographical locations.

4. The method of embodiment 1, further comprising:
in response to the determining, maintaining the DAA list;
determining a location for storing the DAA list; and
obtaining a quarantine time, the quarantine time identifying a time period that a reset of the DAA list will not be accepted.

5. The method of embodiment 4, further comprising:
transmitting a response message, the response message comprising the quarantine time.

6. The method of embodiment 5, further comprising:
receiving a second control plane message, the second control plane message indicating a request for a reset of the DAA list; and
in response to receiving the second control plane message, determining whether the time period identified in the quarantine time has expired.

7. The method of embodiment 6, further comprising:
determining that the time period identified in the quarantine time has not expired; and
in response to determining that the time period identified in the quarantine time has not expired, deciding not to reset the DAA list.

8. The method of embodiment 6, further comprising:
determining that the time period identified in the quarantine time has expired; and
in response to determining that the time period identified in the quarantine time has expired:
resetting the DAA list, and
transmitting a second response message, the second response message comprising information indicating that the DAA list has been reset (e.g. the second response message may comprise an empty DAA list).

9. The method of embodiment 1, further comprising:
in response to the determining, removing the DAA list; and
transmitting to the UE a response message, the response message comprising a new DAA list that is different than the DAA list.

10. A control node configured to perform the method of any one of the embodiments 1-9.

11. A computer program comprising instructions for performing the method of any of the embodiments 1-9.

B. UE Embodiments

1. A method performed by a user equipment (UE) for reset of a dynamic allowed area (DAA) list for the UE, the method comprising:
obtaining an indication that a dynamic allowed area threshold has been reached;
in response to obtaining the indication, transmitting a first message (e.g., deregistration request or reset request) to a network node, the first message indicating a request for a reset of the DAA list; and,
receiving a second message from the network node (e.g., deregistration accept or reset response), the second message comprising information indicating whether or not the DAA list has been reset.

1a. The method of embodiment 1, wherein the second message comprises a quarantine time (i.e., the second message comprising information indicating a period of time during which the DAA list for the UE will not be reset in response to a rest indication transmitted by the UE (e.g., a deregistration request or an explicit reset request).

1b. The method of embodiment 1a, further comprising the UE waiting until the quarantine time expires before transmitting a DAA list reset request requesting a reset of the DAA list.

2. The method of embodiment 1a or 1b, wherein the second message further comprises the DAA list.

3. The method of embodiment 1a or 1b, wherein the quarantine time identifies a time period during which a request for a reset of the DAA list will be rejected.

4. The method of embodiment 3, further comprising:
transmitting, at a time subsequent to an expiration of the time period, a third message, the third message indicating a request for a reset of the DAA list; and
receiving a fourth message, the fourth message comprising information indicating whether or not the DAA list has been reset in response to the third message.

5. A UE configured to perform the method of any one of the embodiments 1-4.

6. A computer program comprising instructions for performing the method of any of the embodiments 1-4.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

ABBREVIATIONS

AMF Access and Mobility Management Function
FWA Fixed Wireless Access
HRL Handover Restriction list
IoT Internet of Things
LTE Long Term Evolution (a 4G mobile network)
MBB Mobile Broadband
NG Next Generation mobile network i.e. 5G
PCF Policy Control Function
UDM Unified Data Management
TA Tracking Area
AA Allowed Area
DAA Dynamic Allowed Area

The invention claimed is:

1. A method for reset of a dynamic allowed area (DAA) list for a user equipment (UE), the method comprising:
receiving, at a network node, a control plane message indicating a request for a reset of the DAA list;
in response to receiving the control plane message indicating a request for a reset of the DAA list, the network node determining whether to maintain the DAA list or reset the DAA list; and
the network node, based on the determination, maintaining or resetting the DAA list.

2. The method of claim 1, wherein
the network node is an Access and Mobility Management Function (AMF), a Policy Control Function (PCF), or a combination of an AMF and a PCF, and
the control plane message is a deregistration request or a reset request.

3. The method of claim 1, wherein determining whether to maintain the DAA list or reset the DAA list comprises:
determining whether a number of attempts by the UE to reset the DAA list has reached a threshold;
determining a subscription type and a frequency of attempts by the UE to reset the DAA list; or
determining a number of attempts by the UE to reset the DAA list in one or more geographical locations.

4. The method of claim 1, wherein
the network node determines to maintain the DAA list, and
the method further comprise determining a quarantine time, the quarantine time identifying a time period during which a reset of the DAA list will not be accepted.

5. The method of claim 4, further comprising:
after receiving the first control plane message, receiving a second control plane message, the second control plane message indicating a request for a reset of the DAA list;
in response to receiving the second control plane message, determining whether the time period identified by the determined quarantine time has expired; and
as a result of determining that the time period has not expired, refraining from resetting the DAA list.

6. The method of claim 5, further comprising:
after refraining from resetting the DAA list, determining that the time period has expired; and
as a result of determining that the time period as expired:
resetting the DAA list, and
transmitting a second response message, the second response message comprising information indicating that the DAA list has been reset.

7. The method of claim 1, wherein the DAA list is a set of allowed areas, AAs, or Tracking Areas, TAs, a list of node IDs, or a list of cell IDs, that automatically change over time.

8. The method of claim 1, wherein a granularity of the DAA list is one or more of TA, RAN node area, or cell level.

9. The method of claim 1, wherein the step of determining whether to maintain the DAA list or reset the DAA list comprises:
determining whether a number of attempts by the UE to reset the DAA list has reached a threshold, or
determining whether or not, at the time the control plane message was received, a quarantine time had expired, the quarantine time being a time period during which a reset of the DAA list will not be accepted.

10. The method of claim 1, wherein
the DAA list comprises a plurality of entries, and
the network node, based on the determination, resets the DAA list by removing the plurality of entries from the list.

11. A control node the control node comprising:
a transmitter;
a receiver;
a memory; and
processing circuitry, wherein the control node is configured to perform the method of claim 1.

12. A computer program product comprising a non-transitory computer readable medium storing instructions for performing the method of claim 1.

13. A method performed by a user equipment (UE) for reset of a dynamic allowed area (DAA) list for the UE, the method comprising:
obtaining an indication that a DAA threshold has been reached;
in response to obtaining the indication, transmitting a first message to a network node, the first message indicating a request for a reset of the DAA list; and
receiving a second message transmitted by the network node, the second message comprising information indicating whether or not the DAA list has been reset.

14. The method of claim 13, wherein the second message comprises information indicating a time period during which the DAA list for the UE will not be reset in response to a rest indication transmitted by the UE.

15. The method of claim 14, further comprising the UE determining that the time period has not expired and, as a result of determining that the time period has not expired, the UE refraining from requesting a reset of the DAA list until after the time period has elapsed.

16. The method of claim 15, further comprising:
transmitting, at a time subsequent to the expiration of the time period, a third message, the third message indicating a request for a reset of the DAA list; and
receiving a fourth message responsive to the third message, the fourth message comprising information indicating whether or not the DAA list has been reset.

17. The method of claim 13, wherein the second message further comprises the DAA list.

18. The method of claim 13, wherein the network node is an Access and Mobility Management Function (AMF), a Policy Control Function (PCF), or a combination of an AMF and a PCF.

19. The method of claim 13, wherein the DAA list is a set of allowed areas, AAs, or Tracking Areas, TAs, a list of node IDs, or a list of cell IDs, that automatically change over time.

20. The method of claim 13, wherein a granularity of the DAA list is one or more of TA, RAN node area, or cell level.

21. A UE, the UE comprising:
a transmitter;
a receiver;
a memory; and
processing circuitry, wherein the UE is configured to perform the method of claim 13.

22. A computer program product comprising a non-transitory computer readable medium storing instructions for performing the method of claim 13.

* * * * *